United States Patent [19]
Niino et al.

[11] Patent Number: 5,942,568
[45] Date of Patent: Aug. 24, 1999

[54] POLYOXYMETHYLENE WITH POLYOLEFIN PREPARED FROM SINGLE SITE CATALYST

[75] Inventors: Masahiko Niino, Kurashiki; Sadao Ibe, Tokyo, both of Japan

[73] Assignee: Asahi Kasei Kogyo Kabushiki Kaisha, Osaka, Japan

[21] Appl. No.: 08/817,722

[22] PCT Filed: Oct. 20, 1995

[86] PCT No.: PCT/JP95/02160

§ 371 Date: Apr. 24, 1997

§ 102(e) Date: Apr. 24, 1997

[87] PCT Pub. No.: WO96/12765

PCT Pub. Date: May 2, 1996

[30] Foreign Application Priority Data

Oct. 26, 1994 [JP] Japan .................................. 06-258286

[51] Int. Cl.$^6$ ........................... C08K 03/22; C08K 03/28; C08L 59/02
[52] U.S. Cl. ........................... 524/405; 525/154; 525/186; 524/404
[58] Field of Search ..................... 525/186, 154; 524/405, 404

[56] References Cited

U.S. PATENT DOCUMENTS

| | | |
|---|---|---|
| 2,998,409 | 8/1961 | Dal Nogare et al. . |
| 3,027,352 | 3/1962 | Walling et al. . |
| 4,873,282 | 10/1989 | Yui et al. ................... 524/496 |
| 5,344,875 | 9/1994 | Niino ........................ 525/400 |
| 5,484,567 | 1/1996 | Niino et al. ................ 264/328.1 |
| 5,576,374 | 11/1996 | Betso et al. ................ 525/317 |
| 5,703,187 | 12/1997 | Timmers ..................... 526/348.6 |
| 5,747,620 | 5/1998 | Machida et al. ............. 526/348.2 |

FOREIGN PATENT DOCUMENTS

| | | |
|---|---|---|
| 0 430 215 | 6/1991 | European Pat. Off. . |
| 42-19498 | 10/1967 | Japan . |
| 49-40346 | 4/1974 | Japan . |
| 52-66563 | 2/1977 | Japan . |
| 57-15616 | 3/1982 | Japan . |
| 57-123205 | 7/1982 | Japan . |
| 59-204652 | 11/1984 | Japan . |
| 60-86155 | 5/1985 | Japan . |
| 60-144351 | 7/1985 | Japan . |
| 61-123652 | 6/1986 | Japan . |
| 62-253650 | 11/1987 | Japan . |
| 63-33465 | 2/1988 | Japan . |
| 63-118328 | 5/1988 | Japan . |
| 63-284253 | 11/1988 | Japan . |
| 2-66365 | 3/1990 | Japan . |
| 3-163088 | 7/1991 | Japan . |
| 3-234729 | 10/1991 | Japan . |
| 4-36341 | 2/1992 | Japan . |
| 4-126758 | 4/1992 | Japan . |
| 4-239566 | 8/1992 | Japan . |
| 5-70678 | 3/1993 | Japan . |
| 7-3118 | 1/1995 | Japan . |
| WO 95/00585 | 1/1995 | WIPO . |
| WO 95/04761 | 2/1995 | WIPO . |

Primary Examiner—Robert E. Seller
Attorney, Agent, or Firm—Pennie & Edmonds LLP

[57] ABSTRACT

Polyoxymethylene resin composition comprising (A) 50 to 99.9 parts by weight of a polyoxymethylene resin and (B) 0.1 to 50 parts by weight of a polyolefin resin, containing 30 to 100% by weight of an ethylene unit based on the whole amount of the polyolefin resin, prepared by using a single site catalyst. The present invention provides a polyoxymethylene resin composition which possess excellent lower friction characteristics and wear resistance at temperature over 60° C.

5 Claims, No Drawings

POLYOXYMETHYLENE WITH POLYOLEFIN PREPARED FROM SINGLE SITE CATALYST

TECHNICAL FIELD

The present invention relates to novel polyoxymethylene resin compositions having excellent sliding characteristic at high temperature. More particularly, the present invention relates to polyoxymethylene resin compositions having excellent sliding characteristics especially at high temperature and being preferably used as materials of parts for sliding portions in various precision machines, equipments for office automation and automobiles.

BACKGROUND ART

Hitherto, conventional polyoxymethylene resins have been used widely as engineering plastics for materials of parts in various mechanism portions and equipments for office automation, for the reasons that the polyoxymethylene resins possess well-balanced mechanical properties as well as excellent wear resistant characteristics.

However, only on the basis of their native wear resistance characteristics, conventional polyoxymethylene resins can hardly be said as suitable plastics to be used as materials of parts for sliding portions which should have physical properties good enough to satisfy the requirements. Particularly, in use of conventional polyoxymethylene resins at high temperature, the friction coefficient and wear resistance thereof are increased, thus the sliding characteristics of the resins become worse.

Therefore, at present, for the purpose to improve the sliding characteristics at high temperature, conventional polyoxymethylene resins are used frequently by coating grease to the sliding portions.

However, such a coating of grease prolongs the operation period in working steps. Furthermore, in case of using a fluorocarbon solvent in the coating step, then environmental pollution problems will occur. Under the circumstances, there have been eagerly expected the development of polyoxymethylene resin composition which can be used without need of coating grease.

Currently, however, there have not been known any specific technology for improving the sliding characteristics at high temperature of the polyoxymethylene resin.

As to prior art references related to improvement of sliding characteristics of polyoxymethylene resins, there have been known some literatures e.g., method of adding an ester of 1,4-butanediol with a fatty acid to polyoxymethylene resin (JP-B-55-23304); method of adding a boric acid ester of monofatty acid glyceride (JP-B-57-15616); method of adding polyolefin having active hydrogen atoms and polyethylene and an isocyanate (JP-A-4-126758); method of adding a copolymer of α-olefin with ethylene-vinyl monomer (JP-A-49-40346); method of adding powder of polyethylene having super high molecular weight (JP-A-60-144351); method of adding a polyether type copolymer having an average molecular weight over 500 (JP-A-5-70678); method of adding a thermoplastic elastomer and a lubricating agent so as to be used for low noise gears (JP-A-2-66365); and method of adding a thermoplastic elastomer and an addition product of alkylene oxide to alcohol to a polyacetal block copolymer used as polyoxymethylene resin. According to the methods known in these prior art references, the sliding characteristics at ambient temperature of the polyoxymethylene resins can only be improved, but these known methods are not effective at all to solve the problems caused by increasing the friction coefficient and wear resistance at high temperature.

Furthermore, there have been also known in prior art references that a method of blending a polyolefin to the polyoxymethylene resin (JP-B-42-19498); a method of adding a liquid form ethylene-α-olefin random copolymer to the polyoxymethylene resin (JP-A-4-239566); and a method of adding a modified α-olefin type polymer to the polyoxymethylene resin (JP-B-59-204652). It should be noted that the sliding characteristics at high temperature of conventional polyoxymethylene resin compositions cannot be improved at all by the methods known in these prior art references.

DISCLOSURE OF THE INVENTION

Under such circumstances, the present invention was completed for the purpose to provide polyoxymethylene resin composition which can show very low frictional characteristics and excellent wear resistance characteristics at high temperature such as at 60 to 100° C., which were measured by a point-contacting reciprocal sliding movement test machine.

The present inventors have made extensive studies for achieving the object of the above-mentioned purpose, as a result, the present invention was completed by the fact that a polyoxymethylene resin composition comprising (A) 50 to 99.9 parts by weight of a polyoxymethylene resin and (B) 0.1 to 50 parts by weight of a polyolefin resin containing 30 to 100% by weight of ethylene unit based on the whole polyolefin resin prepared by use of a single site catalyst shows surprisingly very low frictional characteristics and excellent wear resistance properties at high temperature.

BEST MODE FOR CARRYING OUT THE INVENTION

In the present invention, the polyoxymethylene resins being used component (A) can be exemplified by a homopolymer prepared by polymerizing a formaldehyde monomer or a cyclic oligomer such as trimer of formaldehyde (trioxane) or tetramer of formaldehyde (tetraoxane), in which both terminal groups of the homopolymer are sealed with an ether linkage or an ester linkage; an oxymethylene copolymer, containing 0.1 to 20% by weight of oxyalkylene unit having 2 to 8 carbon atoms, prepared by copolymerizing trioxane or tetraoxane with a cyclic ether such as ethylene oxide, propylene oxide, 1,3-dioxorane, a formal of glycol, or a formal of diglycol; the above oxymethylene copolymers further having branched-molecular chains; and an oxymethylene block copolymer, containing more than 50% by weight of segments comprising an oxymethylene unit and less than 50% by weight of segments of a different unit component(s). Preferably, a polyoxymethylene homopolymer may be used. More preferably, in view of the sliding characteristics at high temperature, the polyoxymethylene homopolymers in which both terminal groups are sealed with acetyl groups can be used. Furthermore, a blended product of this polyoxymethylene homopolymer with a polyoxymethylene block copolymer in which one of the terminal groups is sealed with a residual group of an addition product of alkylene oxide to alcohol may be used preferably.

The polyoxymethylene homopolymer in which both terminal groups are sealed with acetyl groups, and the polyoxymethylene block polymer in which one of the terminal groups is sealed with a residual group of an addition product of alkylene oxide to alcohol can be prepared by anion polymerization as disclosed in U.S. Pat. No. 2,998,409 and JP-B-2-24307.

Preferable alcohols to be used for the purpose to form the residual groups of addition products of alkylene oxide to alcohol are aliphatic alcohols having 12 to 22 carbon atoms, furthermore, preferable alkylene oxides to be used for satisfying the same purpose are propylene oxide and tetramethylene oxide. The additional molar number of the alkylene oxide to the alcohol is 1 to 1,000, preferably 1 to 50. Preferable number-average molecular weight of the block copolymers is 10,000 to 500,000, excluding molecular weight in the portion of the terminal groups.

In the blended products of the polyoxymethylene homopolymer, in which both terminal groups are sealed with acetyl groups, with the polyoxymethylene block copolymers, in which one of the terminal groups is sealed with the residual group of addition product of alkylene oxide to alcohol, preferable blending ratio of the block copolymer is 5 to 90% by weight, more preferably 50 to 80% by weight, based on the whole amount of the polyoxymethylene resin.

In the polyoxymethylene resin composition of the present invention, the content of polyoxymethylene resin as component (A) is 50 to 99.9 parts by weight, based on 100 parts by weight of the total amount of component (A) and component (B). When the content of component (A) is lower than 50 parts by weight or higher than 99.9 parts by weight, then the sliding characteristics at high temperature of the polyoxymethylene resin composition will be impaired, and thus not preferable.

In the polyoxymethylene resin composition of the present invention, the polyolefin resin as component (B), which is prepared by using a single site catalyst, and containing 30 to 100% by weight of the ethylene unit, based on the whole polyolefin resin, is used.

The single site catalyst is also called as metallocene catalyst, which contains 1 to 3 molecules of cyclopentadienyl or substituted-cyclopentadienyl which is disclosed in JP-B-4-12283, JP-A-60-35006, JP-A-60-35007, JP-A-60-35008, JP-A-63-280703, JP-A-5-155930, JP-A-3-163088 and U.S. Pat. No. 5,272,236, and has a homogeneous property of the active sites.

The single site catalyst is composed of a transition metal compound represented preferably by the formula (1):

$$R^0_x R^1_a R^2_b R^3_c R^4_d M \tag{1}$$

(wherein M is a transition metal selected from the group consisting of zirconium, titanium and hafnium;

$R^1$ is a ligand having a cyclopentadienyl skeleton; a 5-membered heterocyclic ligand having 1 to 4 carbon atoms, containing nitrogen, phosphorus, arsenic, antimony or bismuth as hetero atom; or a hetero-tridenate ligand in which the nitrogen atom, phosphorus atom or oxygen atom occupies the ligand site, and each one of these ligands is unsubstituted or substituted with at least one substituent selected from the group consisting of an alkyl group of 1 to 20 carbon atoms, an aryl group of 6 to 20 carbon atoms, an aralkyl group in which an alkyl group of 1 to 20 carbon atoms is substituted with at least one aryl group of 6 to 20 carbon atoms, and an alkyl-aryl group in which an aryl group of 6 to 20 carbon atoms is substituted with at least one alkyl group of 1 to 20 carbon atoms, in this case at least two sites in the ligand may be substituted with one type of the substituent, furthermore the alkyl group is in a straight, branched or cyclic form, and at least one of the above-mentioned substituents may be bonded to the ligand through an oxygen, nitrogen, sulfur or phosphorus atom, and at least one of the carbon atoms constituting a substituent may be a silicon atom. $R^2$, $R^3$ and $R^4$ are each, independently a ligand having a cyclopentadienyl skeleton; a 5-membered heterocyclic ligand of 1 to 4 carbon atoms containing nitrogen, phosphorus, arsenic, antimony or bismuth as hetro atom; a hetero-tridenate ligand in which a nitrogen atom, phosphorus atom or oxygen atom occupies the ligand site; an alkyl group of 1 to 20 carbon atoms; an aryl group of 6 to 20 carbon atoms; an aralkyl group in which an alkyl group of 1 to 20 carbon atoms is substituted with at least one aryl group of 6 to 20 carbon atoms; an alkylaryl group in which an aryl group of 6 to 20 carbon atoms is substituted with at least one alkyl group of 1 to 20 carbon atoms; a group of the formula —$SO_3R$, wherein R is an unsubstituted or substituted hydro-carbon group of 1 to 8 carbon atoms being substituted with at least one halogen atom; a halogen atom; or a hydrogen atom; in this case the alkyl group is in a straight chain, branched or cyclic form; further the alkyl group, aryl group, alkylaryl group and aralkyl group may form a heteroatom ligand by bonding to the transition metal through an oxygen atom, nitrogen atom, sulfur atom or phosphorus atom; further at least one carbon atoms of the alkyl group, aryl group, alkylaryl group and aralkyl group may be a silicon atom; further each one of the ligand having a pentadienyl skeleton, the 5-membered heterocyclic ligand of 1 to 4 carbon atoms containing nitrogen, phosphorus, antimony or bismuth as hetero atom, and the hetero-tridenate ligand in which a nitrogen atom, phosphorus atom or oxygen atom occupies the ligand site is unsubstituted or substituted with at least one substituent selected from the group consisting of an alkyl group of 1 to 20 carbon atoms, an aryl group of 6 to 20 carbon atoms, an aralkyl group in which an alkyl group of 1 to 20 carbon atoms is substituted with at least one aryl group of 6 to 20 carbon atoms, and an alkylaryl group in which an aryl group of 6 to 20 carbon atoms is substituted with at least one alkyl group of 1 to 20 carbon atoms; in this case at least two sites of the ligand may be substituted with one type of the substituent; further the alkyl group is in a straight chain, branched or cyclic form, and at least one of the above-mentioned substituents may be bonded to the ligand through an oxygen atom, nitrogen atom, sulfur atom or phosphorus atom, further one of the carbon atoms constituting a substituent may be a silicon atom;

a is an integer larger than 1;

b, c and d are each an integer of 0 to 3; provided that a+b+c+d=4, each one of $R^1$, $R^2$, $R^3$ and $R^4$ is bonded to the transitional metal M.

$R^0$ is an alkylene group of 1 to 20 carbon atoms, a substituted alkylene group of 1 to 20 carbon atoms, an alkylidene group of 1 to 20 carbon atoms, a silylene group, or an substituted silylene group which is substituted with at least one substituent selected from the group consisting of an alkyl group of 1 to 20 carbon atoms, an aryl group of 6 to 20 carbon atoms, an aralkyl group in which an alkyl group of 1 to 20 carbon atoms is substituted with at least one aryl group of 6 to 20 carbon atoms, and an alkylaryl group in which an aryl group of 6 to 20 carbon atoms is substituted with at least one alkyl group of 1 to 20 carbon atoms, each of which combines one member selected from the group consisting of $R^2$, $R^3$ and $R^4$ with $R^1$; and x is 0 or 1.)

Among the above-mentioned transition metal compound, preferable content of the cyclopentadienyl or substituted cyclopentadienyl is 1 to 2 molecules.

The transition metals which are preferably used are the above-mentioned titanium, zirconium or hafnium.

As preferable single site catalysts, zirconium compounds such as, cyclopentadienylzirconium trichloride, pentamethylcyclopentadienylzirconium trichloride, bis(cyclopentadienyl)zirconium dichloride, bis(cyclopentadienyl) zirconium monomethylmonochloride, bis(methylcyclopentadienyl)zirconium dichloride, bis(pentamethylcyclopentadienyl)zirconium dichloride, bis(ethylcyclopentadienyl) zirconium dichloride, bis(cyclopentadienyl)zirconium dialkyl, bis(cyclopentadienyl)zirconium diphenyl, dimethylsilyldicyclopentadienylzirconium dimethyl and methylphosphinedicylopentadienylzirconium dimethyl; titanium compounds such as, bis(indenyl)titanium diphenyl, bis (cyclopentadienyl)titanium dialkyl, bis(cyclopentadienyl) titanium diphenyl, bis(methylcyclopentadienyl)titanium dialkyl, bis(1,2-dimethylcyclopentadienyl)titanium diphenyl and bis(1,2-dimethylcyclopentadienyl)titanium dichloride; hafnium compounds such as bis(cyclopentadienyl) hafnium dichloride and bis(cyclopentadienyl)hafnium dimethyl; and vanadium compounds such as, bis (cyclopentadienyl)vanadium dichloride can be mentioned.

Also, as other preferable single site catalysts, (tert-butylamido)-(tetramethyl-η5-cyclopentadienyl)-1,2-ethanediylzirconium dichloride, (tert-butylamido)-(tetramethyl-η5-cyclopentadienyl)-1,2-ethanediyltitanium dichloride, (methyamido)-(tetra-methyl-η5-cyclopentadienyl)-1,2-ethanediylzirconium dichloride, (methylamido)-(tetramethyl-η5-cyclopentadienyl)-1,2-ethanediyltitanium dichloride, (ethylamido)-(tetramethyl-η5-cyclopentadienyl)-methylenetitanium dichloride, (tert-butylamido)dimethyl-(tetramethyl-η5-cyclopentadienyl) silanetitanium dichloride, (tert-butylamido)dimethyl-(tetramethyl-η5-cyclopentadienyl) silanezirconium dibenzyl, (benzylamido) dimethyl(tetramethyl-η5-cyclopentadienyl)silanetitanium dichloride and (phenylphosphido)dimethyl(tetramethyl-η5-cyclopentadienyl)silanezirconium dibenzyl can be mentioned.

The single site catalyst in the present invention can also be used together with a promoter. As the promoter, for example, those disclosed in the above-mentioned patent publications can be used. Preferable promoter is at least one selected from the group consisting of an organoaluminiumoxy compound having an alkyloxyaluminium unit as repeated unit, such as methylaluminoxane and ethylaluminoxane; an organoaluminium compounds such as an alkylaluminium and a trialkylaluminium; $[Bu_3NH][B(C_6H_4R)_4]$, $C_2B_9H_{13}$, water, a Lewis acid and an ammonium salt.

The above-mentioned organo-aluminiumoxy compounds and organoaluminium compounds may be used singly or in combination thereof.

The polyolefin resin in the present invention can be prepared by known vapor phase polymerization or solution polymerization as disclosed in the above the above-mentioned patent publications. Preferable polymerization is solution polymerization. For example, the polyolefin resin can be prepared, according to a method disclosed in JP-A-3-163088, which is hereby incorporated in its entirety by reference, by contacting one or more types of olefins with the above-mentioned single site catalyst in a vapor phase or in a solution under the addition polymerization conditions.

The ethylene unit content of the polyolefin resin being prepared by using the single site catalyst of the present invention is 30 to 100% by weight based on the total amount of the polyolefin resin. When the ethylene unit content is lower than 30% by weight, sufficient sliding characteristics at high temperature cannot be achieved. In view of the sliding characteristics at high temperature, the ethylene unit content is preferably 60 to 80% by weight.

In order to prepare the above-mentioned olefin resin, other olefins to be copolymerized with ethylene include, fatty group-substituted vinyl monomers, such as propylene, butene-1, pentene-1, 4-methylpentene-1, hexene-1, heptene-1, octene-1, nonen-1, decene-1, undecene-1, dodecene-1, tridecene-1, tetradecene-1, pentadecene-1, hexadecene-1, heptadecene-1, octadecene-1, nonadecene-1, eicocene-1, isobutylene and the like; aromatic-type vinyl monomers, such as styrene, substituted styrene and the like; ester-type vinyl monomers, such as vinyl acetate, acrylic acid esters, metacrylic acid esters, glycidylacrylic acid esters, glycidylmetacrylic acid esters, hydroxyethylmetacrylic acid esters and the like; nitrogen-containing vinyl monomers, such as acrylamide, allylamine, vinyl-p-aminobenzene, acrylonitrile and the like; and dienes, such as butadiene, cyclopentadiene, 1,4-hexadiene, isoprene and the like.

Preferable polyolefins are homopolymers of ethylene or copolymers of ethylene with one or more types of α-olefin of 3 to 20 carbon atoms. From the standpoint of achieving the lower friction coefficient, the number of carbon atoms of α-olefin as the comonomer is preferably 4 to 16, more preferably 6 to 12.

Number-average molecular weight (Mn) of the polyolefin in the present invention, which is measured by an instrument of Model:150c-GPC, manufactured by Waters & Co., and by using 1,2,4-trichlorobenzene as a solvent, at a temperature of 140° C., is preferably 10,000 or more, more preferably 10,000 to 100,000, in terms of the polystyrene standard sample. Furthermore, from the standpoint of achieving the lower friction coefficient, Mn is preferably 20,000 to 60,000.

From the standpoint of achieving further lower friction coefficient, molecular weight distribution Mw/Mn (measured by the above-mentioned GPC apparatus), is preferably lower than 3, more preferably 1.8 to 2.7.

In the present invention, modified-type polyolefins may be used as the polyolefin resins. However, in view of achieving the sliding characteristics at high temperature, unmodified-type polyolefins are preferable.

Furthermore, modified-type polyolefins are polyolefins treated after the modification, including, polyolefins obtained from the polyolefin resins prepared by using the single site catalyst, then subjected to decomposition treatment such as thermal decomposition, or oxidative destruction; or polyolefins obtained from the polyolefin resins prepared by using the single site catalyst, then subjected to graft-modification with a vinyl monomer other than ethylene.

From the standpoint of achieving lower friction coefficient, melt index (ASTM D-1238) of the polyolefin resin of the present invention is preferably 0.5 to 40 g/10 minutes, more preferably 0.7 to 10 g/10 minutes.

The content of the polyolefin resin, as component (B) in the resin composition of the present invention, is 0.1 to 50 parts by weight based on the total amount of the above-mentioned components (A) and (B) being 100 parts by weight. From the standpoint of achieving lower worn amount, the content is preferably 2 to 20 parts by weight. From the standpoint of achieving further lower friction coefficient, the content is preferably 3 to 10 parts by weight. When the content is below 0.1 part by weight, the sliding characteristics at high temperature cannot be improved, while when the content exceeds 50 part by weight, the worn amount at high temperature will be increased.

A resin consisting of a copolymer of ethylene, which is prepared by using a catalyst other than the single site catalyst for example Ziegler catalyst, with one or more of α-olefins of 3 to 20 carbon atoms may be added in an amount of 0.5 to 5 parts by weight to 100 parts by weight of the resin composition comprising component (A) and component (B) of the present invention. From the standpoint of achieving lower friction coefficient at high temperature, the number of carbon atoms of the α-olefin is preferably 4 to 8, and the amount of the copolymer to be added to 100 parts by weight of the resin composition is preferably 0.5 to 3 parts by weight.

Lubricating agent may be added to the resin composition of the present invention. In the present invention, the lubricating agents are organic compounds which are liquid or solid at ambient temperature, which can reduce the reciprocal friction coefficient of the polyoxymethylene resin composition [the friction coefficient (point-contacting reciprocal sliding movement characteristics) is measured by rubbing a flat plate made of the polyoxymethylene resin composition to which a lubricating agent is added, with a counter material made of SUS ($\phi$=5, radius of the point: R=2.5), and by using a reciprocal friction wear resistance test machine (Model: AFT-15MS, manufactured by TOHSOKU SEIMITSU & CO.) under the conditions of temperature: 23° C., load: 2 kg, linear traveling speed: 10 mm/sec. and distance of reciprocal travel: 20 mm].

As examples of the lubricating agent, mineral oils, liquid paraffin, paraffin wax, fatty acids, aliphatic alcohols, aliphatic amides, fatty acid metal salts, fatty acid esters, silicone oils, esters of polyhydric alcohol with fatty acid, esters of polybasic acid with fatty alcohol, glycols, addition products of alkylene oxide to polyalkylene glycol or alcohol, addition products of alkylene oxide to fatty acid, and liquid ethylene-α-olefin random copolymers can be mentioned.

As preferable examples of the lubricating agent, fatty acids such as, lauric acid, myristic acid, palmitic acid, stearic acid, arachidic acid, behenic acid and montanic acid; alcohols such as, hexyl alcohol, octyl alcohol, cetyl alcohol, stearyl alcohol, behenyl alcohol, ethylene glycol, propylene glycol, butylene glycol, 1,4-butanediol, polyethylene glycol, poly-propylene glycol, polytetrahydroxyfuran, copolymers of alkylene glycol consisting of two or more types of alkyleneoxide as monomer unit (e.g. a copolymer of ethylene glycole with propylene glycole), glycerin, polyglycerin and pentaerythritol; esters of the above-mentioned fatty acids and alcohols; addition products of alkylene oxides to the above-mentioned alcohols; fatty acid amides such as, stearylamide, palmitylamide, oleylamide, methylenebis (stearylamide) and ethylenebis-(stearylamide); metal salts of fatty acids such as, calcium stearate, zinc stearate and magnesium stearate; and liquid ethylene-α-olefin random copolymers can be mentioned.

More preferable lubricating agent is at least one selected from the group consisting of an alkylene glycol-type copolymer having a number-average molecular weight of 100 to 5,000 and a liquid ethylene-α-olefin random copolymer.

As examples of the alkylene glycol-type copolymer, tetramethylene glycol-ethylene glycol copolymers, tetramethylene glycol-propylene glycol copolymers, propylene glycol-ethylene glycol copolymers and addition products of alkylene oxide to long chain-fatty alcohol of 1 to 22 carbon atoms can be mentioned. Among these copolymers, tetramethylene glycol-ethylene glycol copolymers containing 30 to 70 mol% of tetramethylene glycol unit, and having a number-average molecular weight of 1,000 to 5,000 are preferable.

As the liquid ethylene-α-olefin random copolymers, there can be mentioned random copolymers of ethylene with one or more of fatty group substituted-vinyl monomers, such as propylene, butene-1, pentene-1, 1,4-methylpentene-1, hexene-1, heptene-1, octene-1, nonene-1, decene-1, undecene-1, dodecene-1, tridecene-1, tetradecene-1, pentadecene-1, hexadecene-1, heptadecene-1, octadecene-1, nonadecene-1, eicocene-1 or iso-butylene. These random copolymers preferably have a number-average molecular weight of 500 to 10,000 measured by using a vapor pressure osmometer, and containing 20 to 80 mol % of the ethylene unit, and also the α-olefin preferably has 3 to 20 carbon atoms. From the standpoint of achieving lower friction coefficient, the ethylene unit content is 30 to 70 mol %. Further, from the standpoint of achieving lower friction coefficient, the number-average molecular weight of the random copolymers is preferably 600 to 8,000, more preferably 700 to 5,000. From the standpoint of achieving lower friction coefficient, the number of carbon atoms of the α-olefin is preferably 3 to 10. The above-mentioned liquid form ethylene-α-olefin random copolymer can be prepared by a known method, for example, a method as disclosed in JP-B-2-1163 by using hydrogen as an agent for controlling the molecular weight in the presence of Ziegler catalyst.

The above-mentioned lubricating agent may be added in an amount of 0.01 to 20 parts by weight based on 100 parts by weight of the above-mentioned resin composition comprising component (A) and component (B). In accordance with addition of the lubricating agent, lower friction coefficient at high temperature can be achieved. From the standpoint of achieving lower friction coefficient, the lubricating agent is preferably added in an amount of 0.1 to 10 parts by weight, more preferably 0.5 to 5 parts by weight, based on 100 parts by weight of the resin composition.

For the purpose to achieve the resin composition of the present invention having further lower friction coefficient, poly-β-alanine copolymer can be added in an amount of 0.01 to 5 parts by weight, preferably 0.1 to 0.5 parts by weight, based on 100 parts by weight of the resin composition comprising component (A) and component (B). The poly-β-alanine copolymer is a copolymer having 3-nylon structure and other molecular structures within its main chain structure. As the examples of preferable poly-β-alanine copolymers, there can be mentioned those prepared by methods disclosed in JP-A-63-118328 and JP-A-3-234729, that is acrylamide or its derivatives, or a poly-β-alanine copolymer obtained by polymerizing acrylamide or its derivative with other vinyl monomer in the presence of a metal alcoholate, the copolymers containing 1.4 to 13 mM of the primary amide/1 g of the polyacrylamide copolymer. Average particle size of the poly-β-alanine copolymers is 1 to 10 μm, preferably 1 to 6 μm.

In addition to the above, lower friction coefficient at high temperature of the resin composition of the present invention can be achieved by adding 5 to 500 ppm, preferably 50 to 300 ppm of boron nitride based on 100 parts by weight of the resin composition of the present invention comprising component (A) and component (B), said boron nitride having an average particle size of 0.5 to 10 μm, and containing 0.01 to 1.0% by weight, preferably 0.05 to 0.2% by weight of diboron trioxide in the whole boron nitride.

The resin composition of the present invention can be pelletized through a melt-kneading operation by using a melt-kneading machine, commonly used at temperature higher than the melting point of the polyoxymethylene resin to be processed. As the melt-kneading machine, a kneader, a roll mill, a single-screw extruder, a double-screw extruder and a multi-screw extruder can be mentioned. However, in consideration of the requirements for sealing resin composition from oxygen and working atmosphere, it is preferable to proceed the pelletization by using a double-screw (two-start screw) extruder under a vent vacuumized condition.

If desired, within the range of not impair the object of the present invention, other additives which are conventionally used as additives for plastics, for example hindered phenols, hindered amines, UV-absorbers, inorganic fillers, pigments and the like may be added to the resin composition of the present invention. Furthermore, other additive which are used in common polyoxymethylene resins for example, melamin or melamin-formaldehyde condensates may also be added.

The polyoxymethylene resin composition of the present invention can be used for materials of parts in various sliding portions of OA (office automation) machines, and in automobiles, for example gears, bearings, levers, key stems, cams, ratchets, rollers, guide rollers for VTR (video tape recorder), side plates, cam gears, gears in copying machines, driving parts of paper supplier in LBP (laser beam printer), gear trains for toner agitater, gears for cartridges, parts of sliding portions in CD-ROM drivers and the like. Particularly, the polymethyleneoxy resin compositions of the present invention can preferably be used for bearings, levers, gears, cams and rollers in automobiles and copying machines, where the working temperature tends to elevate higher than 60° C.

Next, the present invention will be explained in detail by illustrating the following Examples, however, the present invention is not restricted at all thereby.

EXAMPLES 1–28 (Present invention)

As disclosed in U.S. Pat. No. 2,998,409, polyoxymethylene homopolymer powder was prepared from formaldehyde by anion polymerization, and was dried at 80° C. for 3 hours. The homopolymer had an intrinsic viscocity of 1.2 (this value was obtained by measuring a solution thereof which was prepared by dissolving 0.1% by weight of said homopolymer in p-chlorophenol containing 2% by weight of α-pinene), and had a melt index [ASTM D1238-57(E)] of 10.0 g/10 minutes, also both terminal groups of the homopolymer were sealed with acetyl groups.

Polyolefin resins as shown in Table 2 were prepared by a method of solution polymerization [JP-A-3-163088 (which is hereby incorporating in its entirety by reference)] by using (tert-butylamido)dimethyl(tetramethyl-η5-cyclopentadienyl)silanetitanium dichloride as the single site catalyst, and methylaluminoxane as the promoter. The molecular weight of thus prepared polyolefin resins were measured by using an instrument of Model 150c-GPC, manufactured by Waters & Co., and test sample of the resin was dissolved in 1,2,4-trichloro-benzene as a solvent, the measurement was made at temperature of 140° C., and test result were obtained by converting the test value using polystyrene as the standard test sample. The melt index of the polyolefin resins were measured by a method of ASTM D1238 as mentioned above. Under nitrogen gas stream condition, thus prepared polyolefin resin was blended with polyoxymethylene homopolymer in which 0.3 part by weight of "Irganox 245" (manufactured by Ciba-Geigy Corp.) was added as an oxidation inhibitor, and with a lubricating agent as shown in Table 1. The blended product was pelletized by melt-kneading so as to prepare resin compositions as shown in Table 2, by using a dual vented extruder of L/D25, under the conditions in that: preset temperature: 200° C.; number of screw revolutions: 100 rpm; unloading capacity: 3 kg/hour; maximum resin temperature: 205 to 210° C.; kneading time (residence time): 0.5 to 0.7 minutes. Next, thus obtained pellets were dried at 80° C. for 3 hours, then a test piece of molded resin (φ=5, radius of the point R=2.5) was obtained by molding the pellets by using a one ounce-molding machine (Model: T130G, manufactures by Toyo Machinery & Metal Co., Ltd.) under the conditions of: preset cylinder temperature: 200° C.; the mold temperature: 70° C.; cooling time: 10 second.

The point contacting reciprocal movement sliding characteristics of the test piece was measured by using a reciprocal moving friction wear test machine (Model: AFT-15MS, manufactured by TOHSOKU SEIMITSU & CO.) under the conditions of load: 2 kg; linear traveling speed: 10 mm/sec. and distance of reciprocal travel: 20 mm, by using, as a counter material, a flat plate having 3 mm thickness of the polyoxymethylene homopolymer without the above-mentioned polyolefin resin added, and changing an environmental temperature at 60, 80 and 100° C. Test results are shown in Table 2, where the friction coefficient and the worn amount (depth of maximum wear: μm) of the test sample of flat plates were obtained after testing of 30,000 times of reciprocal movements.

TABLE 1

| | Type of lubricating agents |
|---|---|
| A. | Ethylene (40 mol %)-propylene (10 mol %)-octene (50 mol %) random copolymer Mn = 2,600 |
| B. | Ethylene (40 mol %)-propylene (10 mol %)-octene (50 mol %) random copolymer Mn = 500 |
| C. | Ethylene (4.0 mol %)-propylene (10 mol %)-octene (50 mol %) random copolymer Mn = 10,000 |
| D. | Ethylene (40 mol %)-propylene (10 mol %)-octene (50 mol %) random copolymer Mn = 700 |
| E. | Ethylene (40 mol %)-propylene (10 mol %)-octene (50 mol %) random copolymer Mn = 5,000 |
| F. | Tetramethylene glycol (50 mol %)-ethylene glycol copolymer Mn = 3,000 |
| G. | Tetramethylene glycol (10 mol %)-ethylene glycol copolymer Mn = 3,000 |
| H. | Ethylene bis (stearylamide) |
| I. | Addition product of propyleneoxide (20 mol) to stearyl alcohol |
| J. | Cetyl myristate |
| K. | Glycerin monostearate |

TABLE 2

Examples according to the present invention

| | Formulation of the composition | | | | | | Evaluation | | |
|---|---|---|---|---|---|---|---|---|---|
| | POM* | Polyolefin resin | | | | | Lubri- | | |
| Example No. | homo-polymer (Parts by weight) | Added amount (Parts by weight) | Etylene unit (% by weight) | Other monomer (% by weight) | Mn | Mw/Mn | cating agent** (Parts by weight) | Measuring temp. (° C.) | Friction coefficient | Worn amount (μ) |
| 1 | 95.0 | 5 | 75 | Octene-1 (25) | 47,000 | 2.4 | — | 60 80 100 | 0.12 0.11 0.10 | 45 40 40 |
| 2 | 95.0 | 5 | 60 | Octent-1 (40) | 47,200 | 2.5 | — | 60 80 100 | 0.13 0.12 0.11 | 45 40 40 |
| 3 | 95.0 | 5 | 80 | Octene-1 (20) | 47,100 | 2.5 | — | 60 80 100 | 0.13 0.12 0.11 | 45 40 40 |
| 4 | 95.0 | 5 | 100 | — | 46,800 | 2.3 | — | 60 80 100 | 0.14 0.13 0.12 | 50 48 48 |
| 5 | 95.0 | 5 | 75 | Octene-1 (25) | 10,000 | 2.7 | — | 60 80 100 | 0.14 0.13 0.11 | 52 50 50 |
| 6 | 95.0 | 5 | 75 | Octene-1 (25) | 100,000 | 2.7 | — | 60 80 100 | 0.14 0.13 0.12 | 53 51 51 |
| 7 | 95.0 | 5 | 75 | Octene-1 (25) | 45,000 | 3.0 | — | 60 80 100 | 0.14 0.13 0.12 | 50 40 40 |
| 8 | 95.0 | 5 | 75 | Octene-1 (25) | 48,000 | 1.8 | — | 60 80 100 | 0.12 0.11 0.10 | 45 40 40 |
| 9 | 99.9 | 0.1 | 75 | Octene-1 (25) | 47,000 | 2.4 | — | 60 80 100 | 0.15 0.14 0.14 | 63 58 58 |
| 10 | 50.0 | 50 | 75 | Octene-1 (25) | 47,000 | 2.4 | — | 60 80 100 | 0.15 0.14 0.14 | 65 60 60 |
| 11 | 97.0 | 3 | 75 | Octene-1 (25) | 47,000 | 2.4 | — | 60 80 100 | 0.12 0.11 0.10 | 45 40 40 |
| 12 | 90.0 | 10 | 75 | Octene-1 (25) | 47,000 | 2.4 | — | 60 80 100 | 0.12 0.11 0.10 | 45 40 40 |
| 13 | 95.0 | 5 | 75 | Propylene (25) | 42,000 | 2.6 | — | 60 80 100 | 0.15 0.14 0.14 | 65 60 60 |
| 14 | 95.0 | 5 | 75 | Hexadecene-1 (25) | 47,000 | 2.7 | — | 60 80 100 | 0.13 0.12 0.12 | 50 45 45 |
| 15 | 95.0 | 5 | 75 | Hexene-1 (25) | 43,000 | 2.7 | — | 60 80 100 | 0.12 0.11 0.10 | 45 40 40 |
| 16 | 95.0 | 5 | 75 | Octene-1 (25) | 47,000 | 2.4 | A (3.0) | 60 80 100 | 0.10 0.09 0.08 | 25 20 20 |
| 17 | 95.0 | 5 | 75 | Octene-1 (25) | 47,000 | 2.4 | B (3.0) | 60 80 100 | 0.11 0.10 0.09 | 35 30 30 |
| 18 | 95.0 | 5 | 75 | Octene-1 (25) | 47,000 | 2.4 | C (3.0) | 60 80 100 | 0.11 0.10 0.09 | 35 30 30 |
| 19 | 95.0 | 5 | 75 | Octene-1 (25) | 47,000 | 2.4 | D (3.0) | 60 80 100 | 0.10 0.09 0.08 | 25 20 20 |
| 20 | 95.0 | 5 | 75 | Octene-1 (25) | 47,000 | 2.4 | E (3.0) | 60 80 100 | 0.10 0.09 0.08 | 25 20 20 |
| 21 | 95.0 | 5 | 75 | Octene-1 (5) | 47,000 | 2.4 | A (0.01) | 60 80 100 | 0.12 0.11 0.10 | 40 38 38 |
| 22 | 95.0 | 5 | 75 | Octene-1 (25) | 47,000 | 2.4 | A (20) | 60 80 100 | 0.12 0.11 0.10 | 38 35 35 |

TABLE 2-continued

Examples according to the present invention

| | Formulation of the composition | | | | | | | Evaluation | | |
|---|---|---|---|---|---|---|---|---|---|---|
| | POM* | Polyolefin resin | | | | | Lubri- | | | |
| Example No. | homo-polymer (Parts by weight) | Added amount (Parts by weight) | Etylene unit (% by weight) | Other monomer (% by weight) | Mn | Mw/Mn | cating agent** (Parts by weight) | Measuring temp. (° C.) | Friction coefficient | Worn amount (μ) |
| 23 | 95.0 | 5 | 75 | Octene-1 (25) | 47,000 | 2.4 | F (3.0) | 60 80 100 | 0.10 0.09 0.08 | 26 22 22 |
| 24 | 95.0 | 5 | 75 | Octene-1 (25) | 47,000 | 2.4 | G (3.0) | 60 80 100 | 0.11 0.09 0.09 | 30 28 28 |
| 25 | 95.0 | 5 | 75 | Octene-1 (25) | 47,000 | 2.4 | H (3.0) | 60 80 100 | 0.11 0.09 0.09 | 40 38 35 |
| 26 | 95.0 | 5 | 75 | Octene-1 (25) | 47,000 | 2.4 | I (3.0) | 60 80 100 | 0.11 0.09 0.09 | 38 35 35 |
| 27 | 95.0 | 5 | 75 | Octene-1 (25) | 47,000 | 2.4 | J (3.0) | 60 80 100 | 0.12 0.11 0.10 | 40 38 35 |
| 28 | 95.0 | 5 | 75 | Octene-1 (25) | 47,000 | 2.4 | K (3.0) | 60 80 100 | 0.12 0.10 0.10 | 40 38 35 |

*POM = polyoxymethylene)
**See Table 1)

EXAMPLES 29–33 (Comparison)

In Examples 29–31, polyolefin resins, having compositions as shown in Table 3, prepared by method similar to that employed in Example 1 were used in the tests, and in Examples 32 and 33, polyolefin resins prepared by using a titanium-type Ziegler catalyst consisting of anhydrous magnesium chloride and $TiCl_4$ (disclosed in JP-A-60-144351) were used in the test. The tests were conducted by procedure similar to that employed in Example 1. Results are shown in Table 3.

TABLE 3

Comparative examples

| | Formulation of the composition | | | | | | | Evaluation | | |
|---|---|---|---|---|---|---|---|---|---|---|
| | POM* | Polyolefin resin | | | | | Lubri- | | | |
| Example No. | homo-polymer (Parts by weight) | Added amount (Parts by weight) | Etylene unit (% by weight) | Other monomer (% by weight) | Mn | Mw/Mn | cating agent** (Parts by weight) | Measuring temp. (° C.) | Friction coefficient | Worn amount (μ) |
| 29 | 95.0 | 5 | 20 | Octene-1 (80) | 47,000 | 2.4 | — | 60 80 100 | 0.20 0.25 0.30 | 120 130 130 |
| 30 | 99.95 | 0.05 | 75 | Octent-1 (25) | 47,000 | 2.4 | — | 60 80 100 | 0.30 0.40 0.45 | 140 160 170 |
| 31 | 47.0 | 53 | 75 | Octene-1 (25) | 47,000 | 2.4 | — | 60 80 100 | 0.20 0.25 0.30 | 140 170 170 |
| 32 | 95.0 | 5 | 75 | Octene-1 (25) | 40,100 | 6.0 | — | 60 80 100 | 0.25 0.30 0.35 | 130 150 160 |
| 33 | 95.0 | 5 | 100 | — | 28,000 | 5.0 | — | 60 80 100 | 0.30 0.40 0.45 | 150 170 180 |

*POM = polyoxymethylene

EXAMPLE 34 (Present invention)

Test was conducted by using resin composition and test method similar to those employed in Example 1, except that in place of the polyoxymethylene homopolymer used in Example 1, polyoxymethylene copolymer prepared by cation polymerization of trioxane with ethylene oxide, as disclosed in U.S. Pat. No. 3,027,352, was used. The polyoxymethylene copolymer had an intrinsic viscosity: 1.1; a melt index:10 g/10 minutes; and contained oxyethylene group 2.8% by weight. As a result, the friction coefficients at 60, 80 and 100° C. were 0.13, 0.12 and 0.12, respectively. The worn amounts at 60, 80 and 100° C. were 55, 50 and 50 µm, respectively.

EXAMPLE 35 (Present invention)

Test was conducted by procedure similar to that employed in Example 1, except that test sample was prepared by adding 2 parts by weight of ethylene-octene (25% by weight) copolymer obtained by using the Ziegler catalyst which was used in Example 32 (comparison), to 100 parts by weight of the resin composition of Example 34. As a result, the friction coefficients at 60, 80 and 100° C. were 0.12, 0.12 lnd 0.10, respectively. The worn amounts at 60, 80 and 100° C. were 45, 40 and 40 µm, respectively.

EXAMPLE 36 (Present invention)

Test was conducted by procedure similar to that employed in Example 1, except that in place of the polyoxymethylene homopolymer in which both terminal groups were acetylated as used in Example 1, a blended product of 40 parts by weight of polyoxymethylene block copolymer (MI: 10 g/10 minutes) in which one of the two terminal groups was sealed with a residual group of addition product of propylene oxide (20 mol) to stearyl alcohol, and the remainder of terminal group was sealed with acetyl group, and which was prepared by a method of anion polymerization as disclosed in JP-B-2-24307, with 60 parts by weight of polyoxymethylene homopolymer (MI; 10 g/10 minutes) in which both terminal groups are acetylated. As a result, the friction coefficients at 60, 80 and 100° C. were 0.11, 0.10 and 0.09, respectively, and the worn amounts were 40, 35 and 35 µm, respectively.

EXAMPLE 37 (Present invention)

Test was conducted by procedure similar to that employed in Example 1. Test sample was obtained by adding 0.3 part by weight of poly-β-alanine copolymer to 100 parts by weight of the resin composition of Example 1, said poly-β-alanine copolymer was prepared by methods as disclosed in JP-A-63-118328 and JP-A-3-234729, in that acrylamide and methylenebisacrylamide (10 mol %) were polymerized in the presence of a metal alcoholate, said poly-β-alanine copolymer contained 10 mM/lg of polymer of primary amide, and its average particle size was 4 µm. As a result, the friction coefficients at 60, 80 and 100° C. were 0.12, 0.10 and 0.09, respectively, and the worn amounts were 43, 38 and 38 µm, respectively.

EXAMPLE 38 (Present invention)

Test was conducted by procedure similar to that employed in Example 1. Test sample was prepared by adding 200 ppm of boron nitride containing 0.1% by weight of diboron trioxide therein, having an average particle size of 1 µm, to 100 part by weight of the resin composition of Example 36. As a result, the friction coefficients at 60, 80 and 100° C. were 0.11, 0.10 and 0.09, respectively, and the worn amounts were 41, 36 and 35 µm, respectively.

Industrial Applicability

Polyoxymethylene resin compositions of the present invention possess excellent sliding characteristics in high temperature working atmosphere over 60° C., where conventional polyoxymethylene resin can hardly be used. For this reason, the polyoxymethylene resin composition of the present invention can be preferably applied to part materials of sliding portions in precision machines, OA (office automation) machines and automobile.

We claim:

1. A polyoxymethylene resin composition comprising (A) 90 to 97 parts by weight of a polyoxymethylene resin and (B) 3 to 10 parts by weight of a polyolefin resin, having a molecular weight distribution of Mw/Mn not more than 3 and containing 60 to 100% by weight of an ethylene unit based on whole polyolefin resin prepared by using a single site catalyst, provided that the total amount of component (A) and component (B) make 100 parts by weight.

2. A polyoxymethylene resin composition according to claim 1, wherein the polyolefin resin is a homopolymer of ethylene or a copolymer of ethylene with at least one α-olefin of 3 to 20 carbon atoms.

3. A polyoxymethylene resin composition according to claim 1, wherein the polyolefin resin is one prepared by using the single site catalyst consisting of a transition metal compound represented by the following formula (1):

$$R^0{}_xR^1{}_aR^2{}_bR^3{}_cR^4{}_dM \qquad (1).$$

wherein M is a transition metal selected from the group consisting of zirconium, titanium and hafnium;

$R^1$ is a ligand having a cyclopentadienyl skeleton; a 5-membered heterocyclic ligand having 1 to 4 carbon atoms, containing nitrogen, phosphorus, arsenic, antimony or bismuth as hetero atom; or a hetero-tridenate ligand in which the nitrogen atom, phosphorus atom or oxygen atom occupies the ligand site, and each one of these ligands is unsubstituted or substituted with at least one substituent selected from the group consisting of an alkyl group of 1 to 20 carbon atoms, an aryl group of 6 to 20 carbon atoms, an aralkyl group in which an alkyl group of 1 to 20 carbon atoms is substituted with at least one aryl group of 6 to 20 carbon atoms, and an alkyl-aryl group in which an aryl group of 6 to 20 carbon atoms is substituted with at least one alkyl group of 1 to 20 carbon atoms, in this case at least two sites in the ligand may be substituted with one type of the substituent, furthermore the alkyl group is in a straight, branched or cyclic form, and at least one of the above-mentioned substituents may be bonded to the ligand through an oxygen, nitrogen, sulfur or phosphorus atom, and at least one of the carbon atoms constituting a substituent may be a silicon atom. $R^2$, $R^3$ and $R^4$ are each, independently a ligand having a cyclopentadienyl skeleton; a 5-membered heterocyclic ligand of 1 to 4 carbon atoms containing nitrogen, phosphorus, arsenic, antimony or bismuth as hetro atom; a hetero-tridenate ligand in which a nitrogen atom, phosphorus atom or oxygen atom occupies the ligand site; an alkyl group of 1 to 20 carbon atoms; an aryl group of 6 to 20 carbon atoms; an aralkyl group in which an alkyl group of 1 to 20 carbon atoms is substituted with at least one aryl group of 6 to 20 carbon atoms; an alkylaryl group in which aryl group of 6 to 20 carbon atoms is substituted with at least one alkyl group of 1 to 20 carbon atoms; a group of the formula —$SO_3R$, wherein R is an unsubstituted or substituted hydrocarbon group of 1 to 8 carbon atoms being substituted with at least one halogen atom; a halogen atom; or a hydrogen atom; in this case the alkyl group is in a straight chain, branched or cyclic form; further the alkyl group, aryl group, alkylaryl group and aralkyl group may form a heteroatom ligand by bonding to the transition metal through an oxygen atom, nitrogen atom, sulfur atom or phosphorus atom; further at least one carbon atoms of the alkyl group, aryl group, alkylaryl group and aralkyl group may be a silicon atom; further each one of the ligand having a pentadienyl skeleton, the 5-membered heterocyclic ligand of 1 to 4 carbon atoms containing nitrogen, phosphorus, antimony or bismuth as hetero atom, and the hetero-tridenate ligand in which a nitrogen atom, phosphorus atom or oxygen atom occupies the ligand site is unsubstituted or substituted with at least one substituent selected from the group consisting of an alkyl group of 1 to 20 carbon atoms, an aryl group of 6 to 20 carbon atoms, an aralkyl group in which an alkyl group of 1 to 20 carbon atoms is substituted with at least one aryl group of 6 to 20 carbon atoms, and an alkylaryl group in which an aryl group of 6 to 20 carbon atoms is substituted with at least one alkyl group of 1 to 20 carbon atoms; in this case at least two sites of the ligand may be substituted with one type of the substituent; further the alkyl group is in a straight chain, branched or cyclic form, and at least one of the above-mentioned substituents may be bonded to the ligand through an oxygen atom, nitrogen atom, sulfur atom or phosphorus atom, further one of the carbon atoms constituting a substituent may be a silicon atom;

a is an integer larger than 1;

b, c and d are each an integer of 0 to 3; provided that a+b+c+d=4, each one of $R^1$, $R^2$, $R^3$ and $R^4$ is bonded to the transitional metal M;

$R^0$ is an alkylene group of 1 to 20 carbon atoms, a substituted alkylene group of 1 to 20 carbon atoms, an alkylidene group of 1 to 20 carbon atoms, a silylene group, or an substituted silylene group which is substituted with at least one substituent selected from the group consisting of an alkyl group of 1 to 20 carbon atoms, an aryl group of 6 to 20 carbon atoms, an aralkyl group in which an alkyl group of 1 to 20 carbon atoms is substituted with at least one aryl group of 6 to 20 carbon atoms, and an alkylaryl group in which an aryl group of 6 to 20 carbon atoms is substituted with at least one alkyl group of 1 to 20 carbon atoms, each of which combines one member selected from the group consisting of $R^2$, $R^3$ and $R^4$ with $R^1$; and x is 0 or 1.

4. A polyoxymethylene resin composition according to claim 1, wherein the polyoxymethylene resin composition is a polyoxymethylene homopolymer in which both terminal groups are sealed with acetyl groups.

5. A polyoxymethylene resin composition according to any one of claims 1–4, wherein the polyoxymethylene resin composition further contains 2 to 500 ppm of boron nitride, having an average particle size of 0.5 to 10 μm, and containing 0.01 to 1.0% by weight of diboron trioxide based on the whole amount of boron nitride.

* * * * *